(12) United States Patent
Baptist et al.

(10) Patent No.: US 10,802,732 B2
(45) Date of Patent: Oct. 13, 2020

(54) MULTI-LEVEL STAGE LOCALITY SELECTION ON A LARGE SYSTEM

(71) Applicant: International Business Machines Corporation, Armonk, NY (US)

(72) Inventors: Andrew D. Baptist, Mt. Pleasant, WI (US); Jason K. Resch, Chicago, IL (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 16/412,167

(22) Filed: May 14, 2019

(65) Prior Publication Data

US 2019/0265898 A1 Aug. 29, 2019

Related U.S. Application Data

(63) Continuation of application No. 15/671,670, filed on Aug. 8, 2017, now Pat. No. 10,394,476, which is a
(Continued)

(51) Int. Cl.
*G06F 11/10* (2006.01)
*G06F 3/06* (2006.01)
(Continued)

(52) U.S. Cl.
CPC ............ *G06F 3/0631* (2013.01); *G06F 3/064* (2013.01); *G06F 3/067* (2013.01); *G06F 3/0619* (2013.01);
(Continued)

(58) Field of Classification Search
CPC ...... G06F 3/0631; G06F 3/0638; G06F 3/064; G06F 3/0644; G06F 3/067;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Wikipedia's Global Namespace historical version published Feb. 25, 2017 https://en.wikipedia.org/w/index.php?title=Global_Nannespace &oldid=767285263 (Year: 2017).*
(Continued)

*Primary Examiner* — Joseph O Schell
(74) *Attorney, Agent, or Firm* — Garlick & Markison; Timothy W. Markison; Timothy D. Taylor (57) ABSTRACT

A method includes obtaining a plurality of sets of write requests regarding a plurality of sets of encoded data slices. During a first time period, the method continues by identifying a set of storage units of a dispersed storage network and identifying a first namespace subrange of a namespace associated with the set of storage units. The method continues by issuing a first set of write requests of the plurality of sets of write requests to a first subset of storage units of the set of storage units regarding first sets of encoded data slices to be stored in the first namespace subrange. The method continues by issuing a second set of write requests of the plurality of sets of write requests to a second subset of storage units of the set of storage units regarding second sets of encoded data slices to be stored in the first namespace subrange.

18 Claims, 6 Drawing Sheets

Related U.S. Application Data continuation-in-part of application No. 14/636,860, filed on Mar. 3, 2015, now Pat. No. 9,762,395.

(60) Provisional application No. 61/986,399, filed on Apr. 30, 2014.

(51) Int. Cl.

| | | |
|---|---|---|
| *G06F 11/07* | (2006.01) | |
| *G06F 11/20* | (2006.01) | |
| *H04L 29/08* | (2006.01) | |
| *H04L 9/06* | (2006.01) | |
| *H04L 9/08* | (2006.01) | |
| *G06F 16/13* | (2019.01) | |
| *G06F 16/188* | (2019.01) | |

(52) U.S. Cl.
CPC ........ *G06F 3/0653* (2013.01); *G06F 11/0727* (2013.01); *G06F 11/0754* (2013.01); *G06F 11/1076* (2013.01); *G06F 11/2058* (2013.01); *H04L 9/0618* (2013.01); *H04L 9/0894* (2013.01); *H04L 67/1097* (2013.01); *G06F 3/0638* (2013.01); *G06F 3/0644* (2013.01); *G06F 11/2094* (2013.01); *G06F 16/13* (2019.01); *G06F 16/134* (2019.01); *G06F 16/196* (2019.01); *H04L 2209/34* (2013.01)

(58) Field of Classification Search
CPC .. G06F 11/0727; G06F 11/2094; G06F 16/13; G06F 16/134; G06F 16/188; G06F 16/196; H04L 67/1097
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,598,070 B1 | 7/2003 | Saito | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,043,499 B2 | 5/2015 | Storm et al. | |
| 10,067,949 B1* | 9/2018 | Stacey, Jr. | G06F 16/182 |
| 2002/0062422 A1 | 5/2002 | Butterworth et al. | |
| 2002/0078174 A1 | 6/2002 | Sim et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0080810 A1 | 4/2005 | Matsuura | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2009/0172277 A1 | 7/2009 | Chen | |
| 2010/0023524 A1 | 1/2010 | Gladwin et al. | |
| 2010/0191779 A1* | 7/2010 | Hinrichs | G06F 3/0689 707/822 |
| 2011/0060759 A1 | 3/2011 | Fienblit et al. | |
| 2011/0072230 A1 | 3/2011 | Dudgeon et al. | |
| 2011/0078277 A1 | 3/2011 | Baptist | |
| 2011/0289122 A1* | 11/2011 | Grube | H04L 67/1097 707/812 |
| 2011/0289359 A1 | 11/2011 | Resch et al. | |
| 2013/0325823 A1* | 12/2013 | Resch | G06F 21/33 707/695 |
| 2014/0298061 A1 | 10/2014 | Volvovski et al. | |
| 2015/0143134 A1* | 5/2015 | Hashimoto | G06F 21/6209 713/193 |
| 2016/0119349 A1* | 4/2016 | Wang | G06F 21/6218 713/168 |
| 2017/0083539 A1* | 3/2017 | Saxena | G06F 16/178 |
| 2017/0123976 A1* | 5/2017 | Motwani | G06F 3/064 |
| 2018/0032249 A1* | 2/2018 | Makhervaks | G06F 9/5011 |
| 2018/0219743 A1* | 8/2018 | Garcia | H04L 41/046 |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(56) References Cited

OTHER PUBLICATIONS

Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Satran, et al.; Internet Small Computer Systems Interface (iSCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

MULTI-LEVEL STAGE LOCALITY SELECTION ON A LARGE SYSTEM

CROSS-REFERENCE TO RELATED APPLICATIONS

The present U.S. Utility patent application claims priority pursuant to 35 U.S.C. § 120 as a continuation of U.S. Utility application Ser. No. 15/671,670, entitled "MULTI-LEVEL STAGE LOCALITY SELECTION ON A LARGE SYSTEM," filed Aug. 8, 2017, which is a continuation-in-part of U.S. Utility application Ser. No. 14/636,860, entitled "ADJUSTING A NUMBER OF DISPERSED STORAGE UNITS," filed Mar. 3, 2015, issued on Sep. 12, 2017 as U.S. Pat. No. 9,762,395, which claims priority pursuant to 35 U.S.C. § 119(e) to U.S. Provisional Application No. 61/986,399, entitled "ALLOCATING STORAGE GENERATIONS IN A DISPERSED STORAGE NETWORK," filed Apr. 30, 2014, expired, all of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
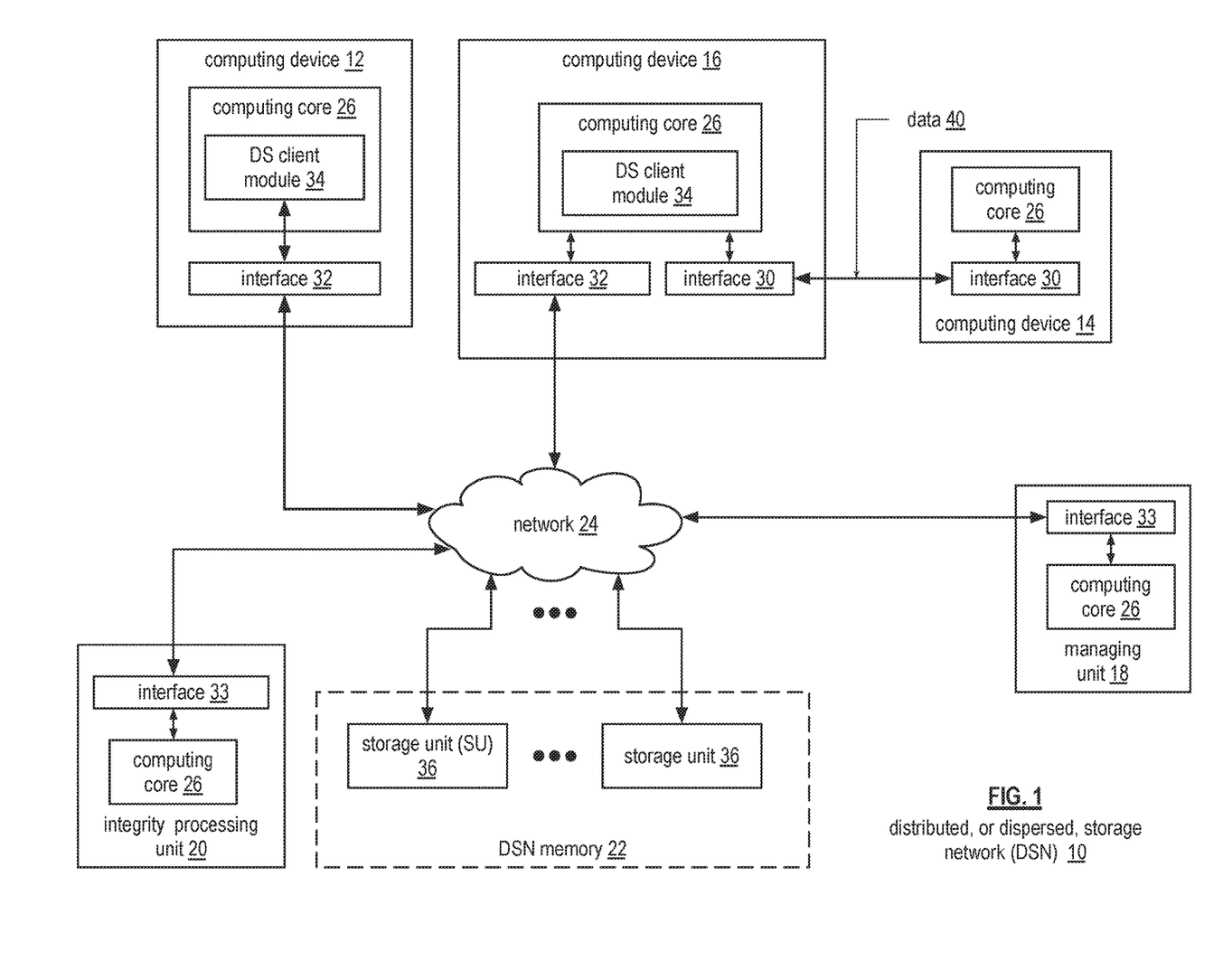
FIG. 1 is a schematic block diagram of an embodiment of a dispersed or distributed storage network (DSN) in accordance with the present invention.

FIG. 1 is FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
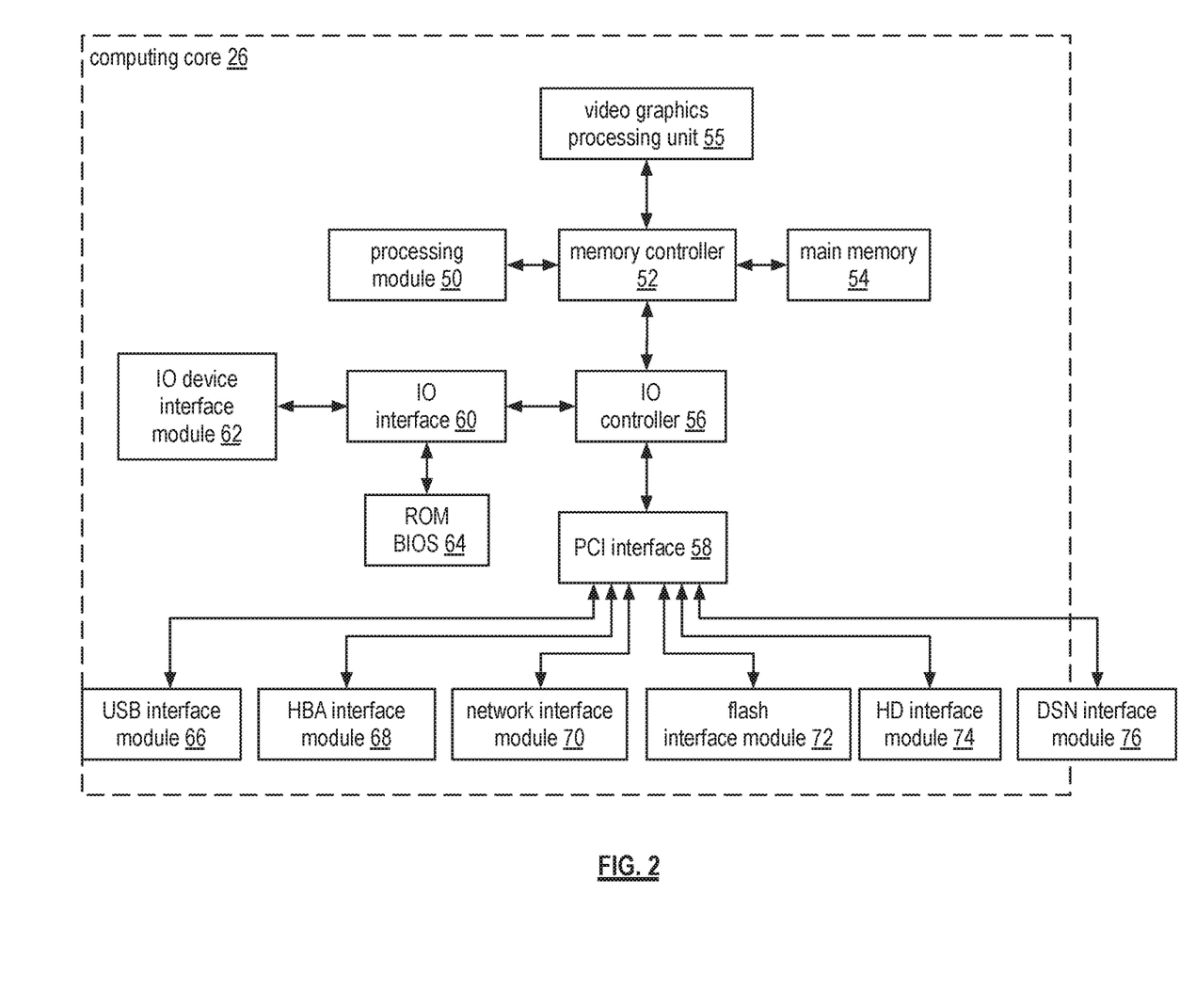
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
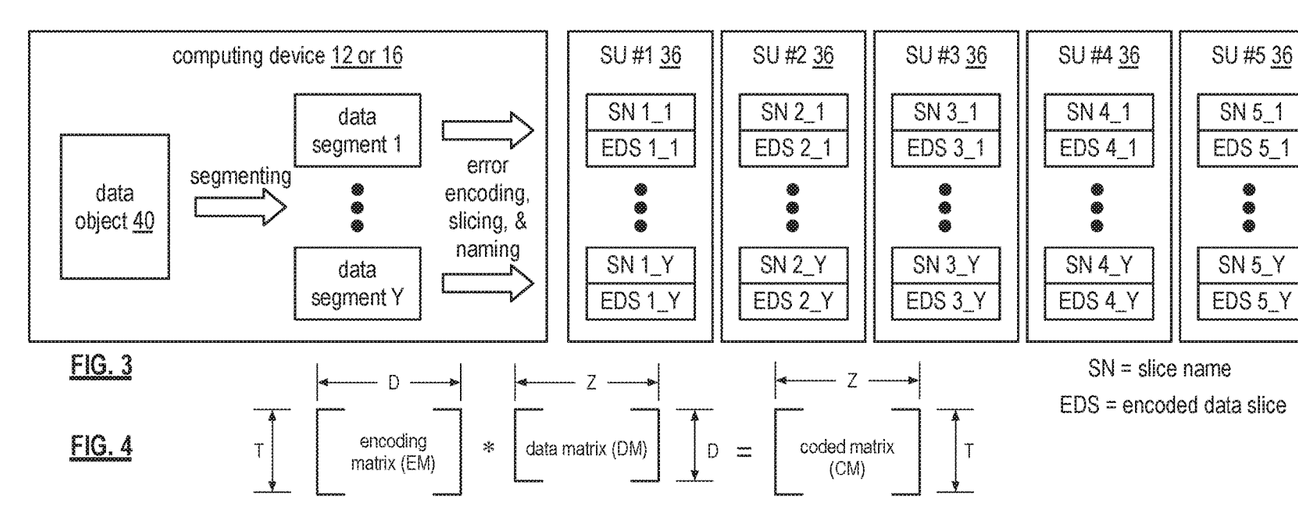
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
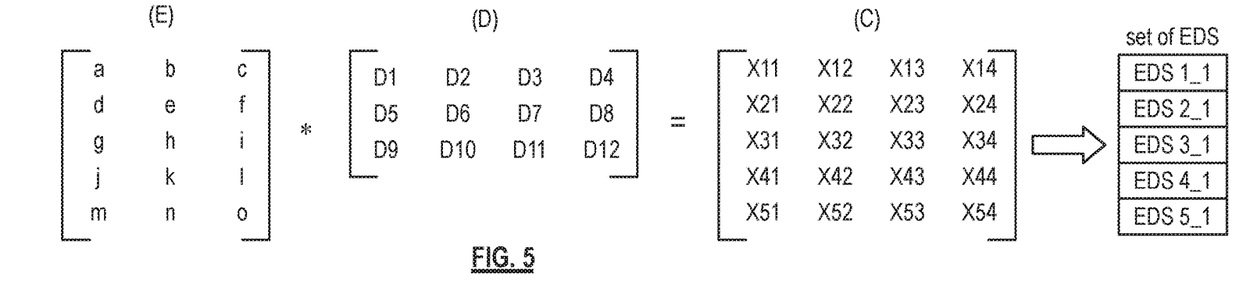
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
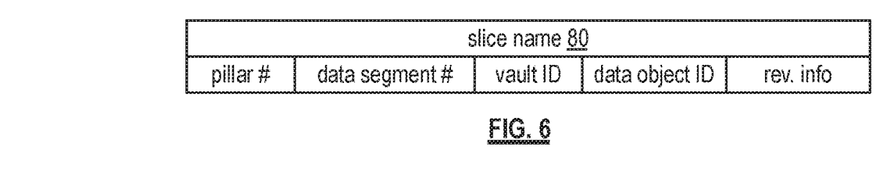
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
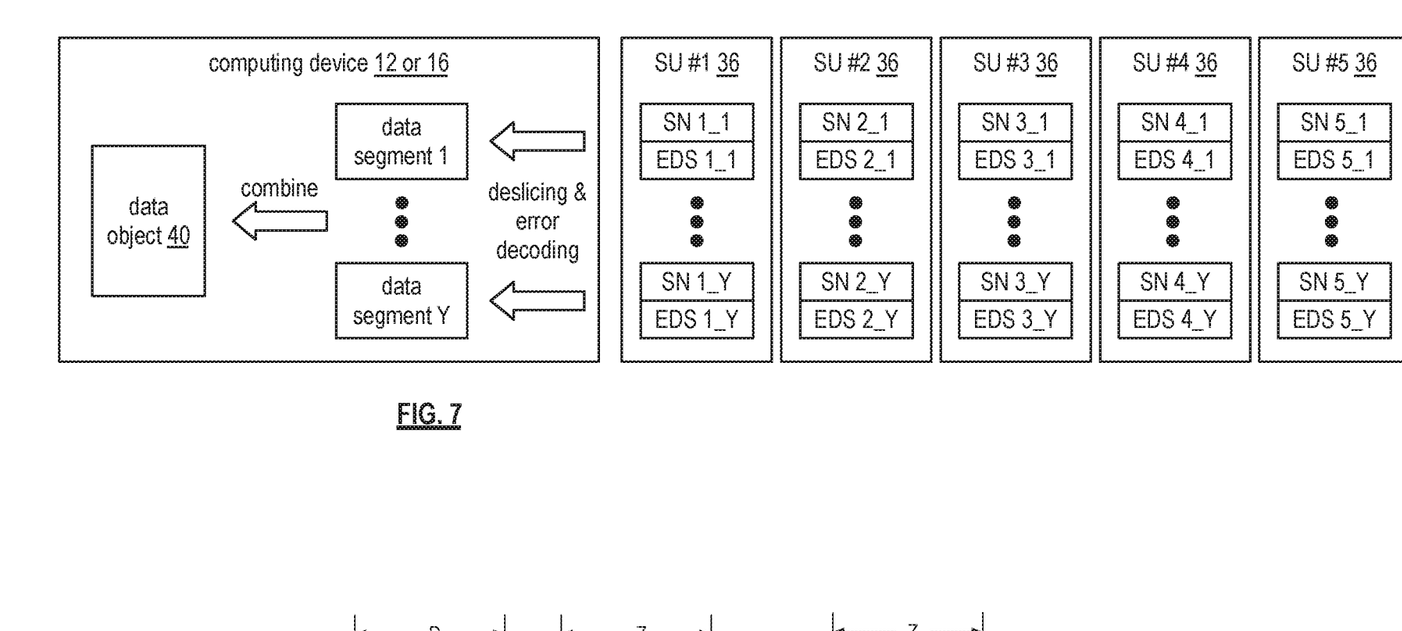
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
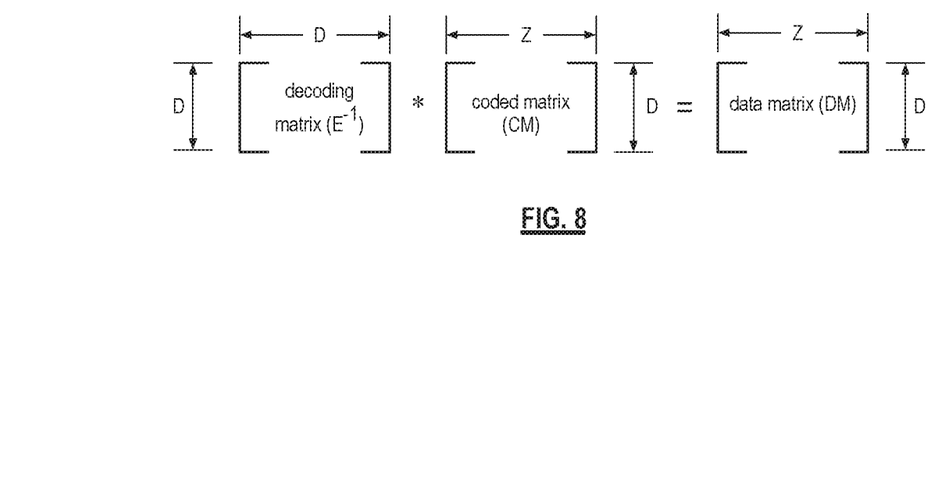
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
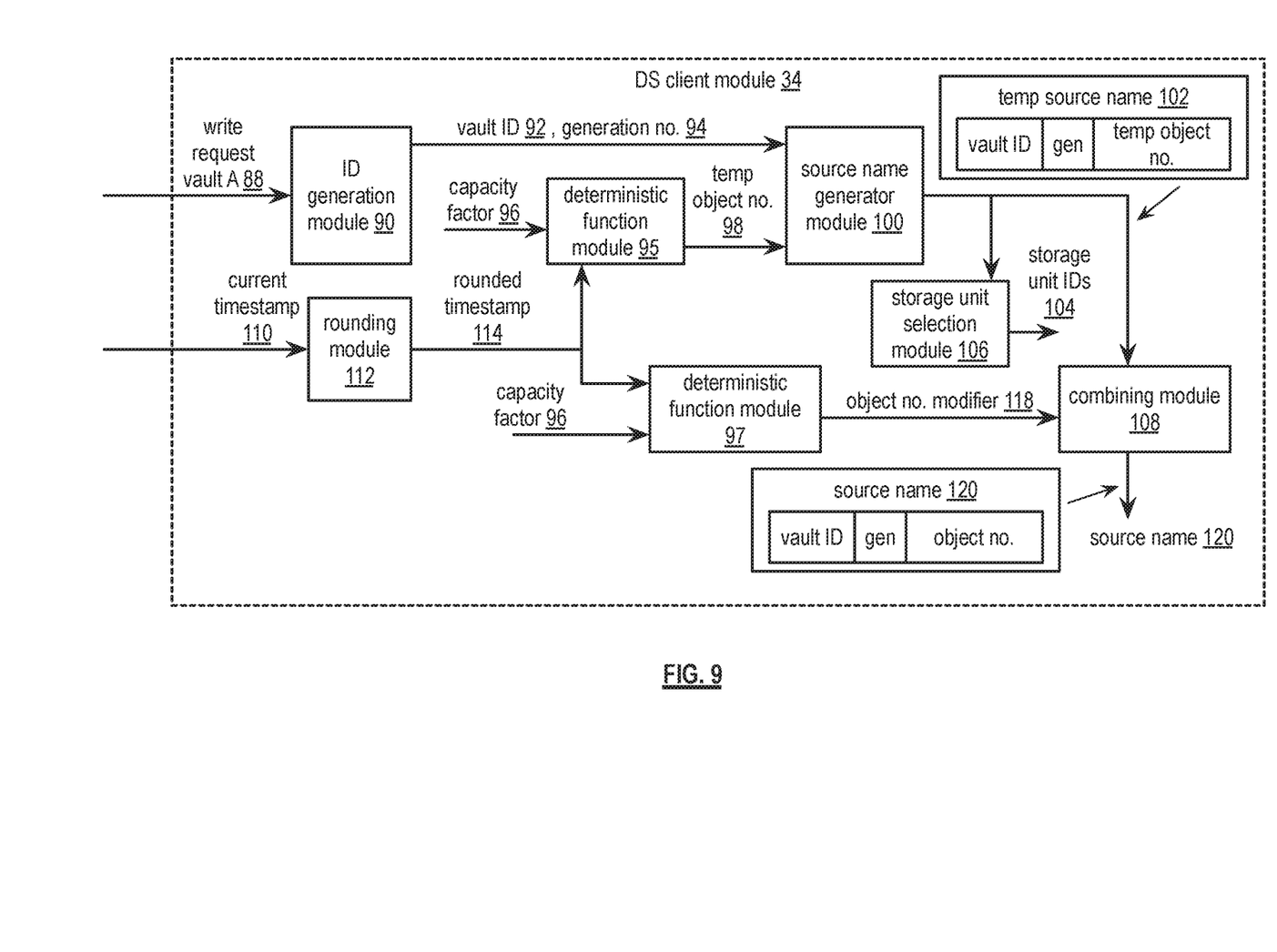
FIG. 9 is a schematic block diagram of an embodiment of a DS client module in accordance with the present invention.

FIG. 9 is a schematic block diagram of a dispersed storage (DS) client module that includes an ID generation module 90, a first deterministic function module 95, a source name generator module 100, a rounding module 112, a second deterministic function module 97, a storage unit selection module 106, and a combining module 108. The DS client module 34 may be implemented utilizing the DS client module 34 of FIG. 1. The DS client module 34 functions to generate a source name for a write data request.

In an example of operation of generating the source name, the ID generation module 90 generates a vault ID 92 and a generation number 94 for a received write request 88 for vault A. The generating may include one or more of performing a registry lookup, accessing a requesting entity to vault ID table, and determining a current generation number indicator for the vault ID. The rounding module 112 performs a rounding to a current timestamp 110 to produce a rounded timestamp 114. As an example, the rounding module 112 may perform a rounding to the current timestamp 110 up to the end of a nearest time period (e.g., ten minutes) to produce a new rounded timestamp 114. Note the DS client module may also utilize the current timestamp to determine to add connections to more sets of storage units when detecting that a timeframe is about to change to the next timeframe.

With the rounded timestamp produced, the first deterministic function module 95 obtains a capacity factor 96. The capacity factor 96 includes one or more of an expected processing performance level (e.g., input-output capacity, processing capacity, performance history, number of simultaneous write operations, etc.) of the set of storage units (e.g., set of storage units 36) and an expected processing performance level of a computing device (e.g., the DS client module 34). The obtaining includes at least one of determining based on performance information for available sets of storage units, performing a lookup, interpreting an error message, and identifying a capacity level of a computing device (e.g., the DS client module). For example, the first deterministic function module 95 obtains the capacity factor 96 that indicates that a third set of storage units of a group of ten sets of storage units is associated with most favorable levels of expected processing performance. Having obtained the capacity factor 96, the first deterministic function module 95 performs a first deterministic function (e.g., a hash) on the capacity factor 96 and the rounded timestamp 114 to produce a temporary object number 98. The temporary object number 98 is associated with a desired set of storage units for a time duration associated with the rounded timestamp 114. For example, the first deterministic function module 95 performs the first deterministic function to produce the temporary object number 98 associated with the third set of storage units (e.g., a best-performing set of storage units).

The source name generator module 100 generates a temporary source name 102 that includes the vault ID 92, the generation number 94, and the temporary object number 98. The storage unit selection module 106 identifies the associated set of storage units 36 based on the temporary source name 102. For example, the storage unit selection module 106 accesses a source name to storage unit identifier table utilizing the temporary source name 102 to produce an identifier 104 of the associated set of storage units. For instance, the storage unit selection module 106 accesses the source name to storage unit identifier table to produce a set of storage unit identifiers 104 for the third set of storage units 36. Each storage unit 36 of the associated set of storage units 36 is associated with an address range assignment that includes the temporary source name 102.

The second deterministic function module 97 applies a second deterministic function to the capacity factor 96 and the rounded timestamp 114 to produce an object number modifier 118, where the object number modifier 118 is to be associated with all data objects written within a time frame associated with the rounded timestamp 114 in accordance with the capacity factor 96. The combining module 108 combines the temporary source name 102 and the object number modifier 118 to produce the source name 120 that includes the vault ID 92, the generation number 94, and an object number, where the object number is modified utilizing the object number modifier 118. For example, the combining module 108 modifies a middle section of the temporary object number 98 with bits of the object number modifier 118 to provide storage locality during the time frame associated with the rounded timestamp 114. For instance, source names 120 generated during the timeframe shall have close locality for different associated objects.

Having generated the source name 120, the DS client module 34 generates a plurality of sets of slice names utilizing the source name 120. For example, the DS client module 34 determines entries of a slice index field, where a different slice index entry is utilized for each slice name of the set of slice names. As another example, the DS client module 34 determines entries of a segment number field as a function of a size of the data object for storage. Having generated the plurality of sets of slice names, the DS client module 34 utilizes the plurality of sets of slice names when issuing write slice requests to the set of storage units associated with the write data request. For example, the DS client module 34 generates a set of write slice requests that includes a set of slice names and sends the set of write slice requests to the third set of storage units.

Figure 10:
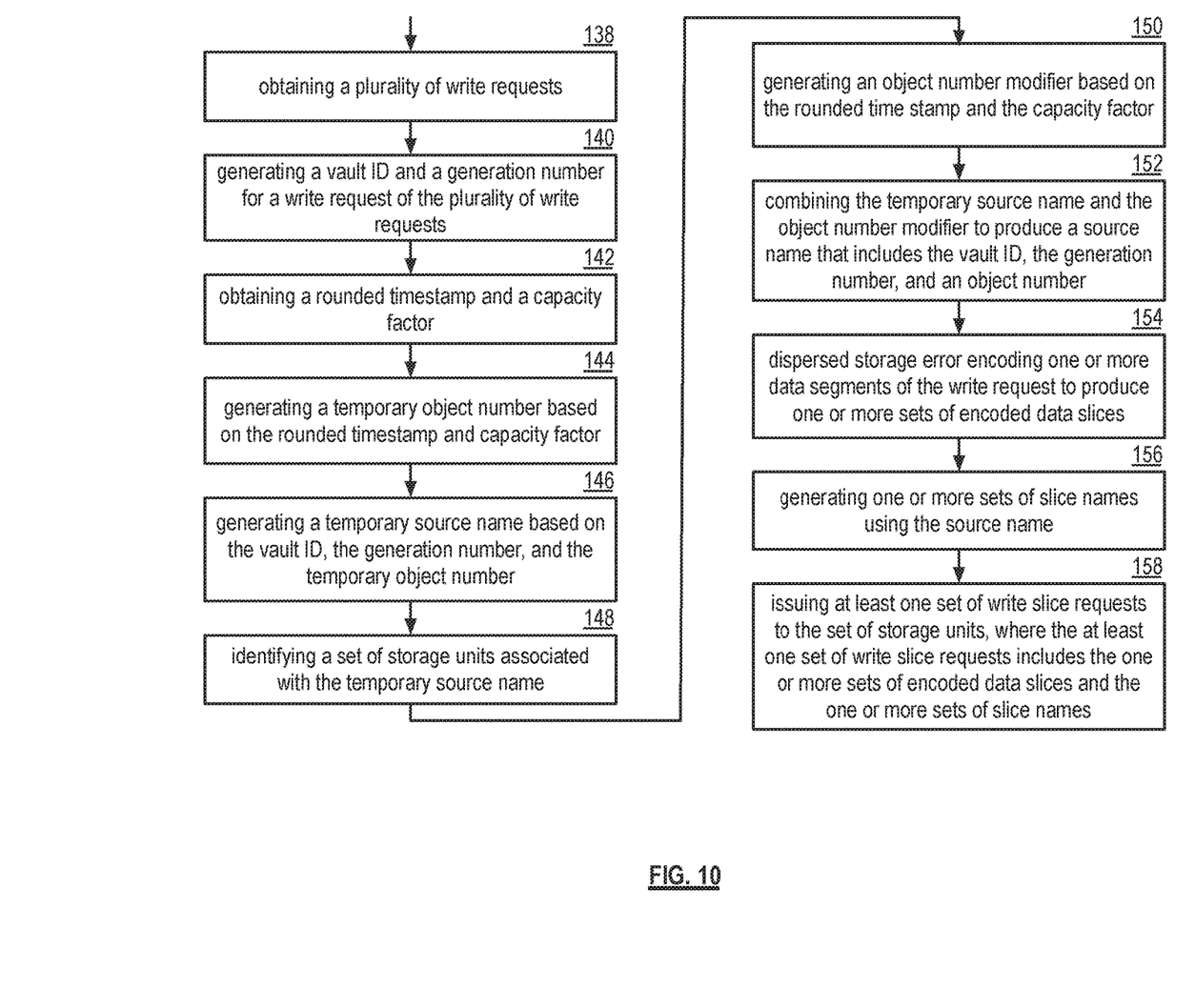
FIG. 10 is a logic diagram of an example of a method of generating a virtual address in accordance with the present invention.

FIG. 10 is a flowchart illustrating an example of generating a virtual address for storing data. In one example, the generating may be in accordance with a multi-level stage locality selection protocol. The multi-level stage locality selection protocol includes identifying a set of storage units and determining a namespace range within the set of storage units for which multiple writers will write to during a specific time period. The method of generating the virtual address begins at step 138, where a computing device (e.g., a dispersed storage (DS) client module, a processing module of the DS client module, etc.) obtains a plurality of write requests. The method continues with step 140 where the computing device generates a vault identifier (ID) and a generation number for a write request of the plurality of write requests. The method continues at step 142 where the computing device obtains a rounded timestamp and a capacity factor. Note the rounded timestamp may be generated by rounding a current timestamp to a time that corresponds to the end of a certain time period (e.g., rounding up every minute, every five minutes, every 30 minutes, etc.). The method continues at step 144 where the computing device generates a temporary object number based on the rounded timestamp and the capacity factor. As an example, the computing device performs a first deterministic function on the rounded timestamp and the capacity factor to produce the temporary object number. Note the temporary object number is associated with a preferred set of storage units (e.g., storage units with favorable performance, storage units with active connections, etc).

The method continues at step 146 where the computing device generates a temporary source name that includes the vault ID, the generation number, and the temporary object number. The method continues at step 148 where the computing device identifies a set of storage units associated with the temporary source name. For example, the computing device identifies a third set of storage units (e.g., the preferred set of storage units) based on the temporary source name the method continues at step 150 where the computing device generates an object number modifier based on the rounded time stamp and the capacity factor. For example, the computing device performs a second deterministic function on the rounded timestamp and the capacity factor to produce the object number modifier. As another example, the computing device performs the second deterministic function to generate a bit pattern for middle bits of an object number to provide a desired locality of storage within the preferred set of storage units.

The method continues at step 152 where the computing device combines the temporary source name and the object number modifier to produce a source name that includes the vault ID, the generation number, and an object number. For example, the computing device overwrites one or more bits of the temporary object number with the object number modifier to produce the object number.

The method continues at step 154 where the computing device dispersed storage error encodes one or more data segments of data of the write request to produce one or more sets of encoded data slices. The method continues at step 156 where the computing device generates one or more sets of slice names using the source name, where the one or more sets of slice names corresponds to the one or more sets of encoded data slices. For example, computing device appends a slice index and a segment number to the source name for one or more segments of the data. The method continues at step 158 where the computing device issues at least one set of write slice requests to the set of storage units, where the at least one set of write slice requests includes the one or more sets of encoded data slices and the one or more sets of slice names.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
    obtaining a plurality of sets of write requests regarding a plurality of sets of encoded data slices, wherein data objects are dispersed storage error encoded to produce pluralities of sets of encoded data slices that are stored in one or more sets of storage units of the DSN, wherein the pluralities of sets of encoded data slices include the plurality of sets of encoded data slices; and
    during a first time period:
        identifying a set of storage units of the one or more sets of storage units;
        identifying a first namespace subrange of a namespace associated with the set of storage units;
        issuing a first set of write requests of the plurality of sets of write requests to a first subset of storage units of the set of storage units, wherein the first set of write requests includes one or more first sets of encoded data slices of the plurality of sets of encoded data slices, and one or more first sets of slice names associated with the one or more first sets of encoded data slices, and wherein the one or more first sets of slice names map the one or more first sets of encoded data slices to storage addresses within the first namespace subrange; and
        issuing a second set of write requests of the plurality of sets of write requests to a second subset of storage units of the set of storage units, wherein the second subset of storage units includes at least one different storage unit than the first subset of storage units, wherein the second set of write requests includes one or more second sets of encoded data slices of the plurality of sets of encoded data slices, and one or more second sets of slice names associated with the one or more second sets of encoded data slices, and wherein the one or more second sets of slice names map the one or more second sets of encoded data slices to storage addresses within the first namespace subrange.

2. The method of claim 1 further comprises:
    during a second time period:
        identifying a second namespace subrange of the namespace associated with the set of storage units;
        issuing a third set of write requests of the plurality of sets of write requests to the first subset of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
        issuing a fourth set of write requests of the plurality of sets of write requests to the second subset of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

3. The method of claim 1 further comprises:
during a second time period:
identifying a second namespace subrange of the namespace associated with the set of storage units;
issuing a third set of write requests of the plurality of sets of write requests to the first subset of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
issuing a fourth set of write requests of the plurality of sets of write requests to the first subset of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

4. The method of claim 1 further comprises:
during a second time period:
identifying a second set of storage units of the one or more sets of storage units;
identifying a second namespace subrange of a second namespace associated with the second set of storage units;
issuing a third set of write requests of the plurality of sets of write requests to a third subset of storage units of the second set of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
issuing a fourth set of write requests of the plurality of sets of write requests to a fourth subset of storage units of the second set of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

5. The method of claim 1, wherein the identifying the set of storage units comprises:
generating a vault identification and a generation number;
obtaining a rounded timestamp and a capacity factor, wherein the obtaining the rounded timestamp includes rounding a current timestamp up to an end of the first time period;
generating a temporary object number based on the rounded timestamp and the capacity factor;
generating a temporary source name based on the vault identification, the generation number, and the temporary object number; and
identifying the set of storage units of the one or more sets of storage units of the DSN based on the temporary source name.

6. The method of claim 5, wherein the generating the vault identification and the generation number includes one or more of:
performing a registry lookup;
accessing a requesting entity to vault identification (ID) table; and
determining a current generation number indicator for the vault ID.

7. The method of claim 5, wherein the capacity factor includes at least one of:
an expected processing performance level of the set of storage units; and
an expected processing performance level of the computing device.

8. The method of claim 5, wherein the obtaining the capacity factor includes at least one of:
determining the capacity factor based on performance information for available sets of storage units of the one or more sets of storage units;
performing a lookup;
interpreting an error message; and
identifying a capacity level of the computing device.

9. The method of claim 5, wherein the identifying the first namespace subrange of the namespace associated with the set of storage units comprises:
generating an object number modifier based on the rounded timestamp and the capacity factor; and
combining the temporary source name and the object number modifier to produce a source name, wherein the source name includes the vault identification, the generation number and an object number, wherein the temporary object number is modified based on the object number modifier to produce an object number; and
identifying the first namespace subrange based on the source name.

10. A computing device of a dispersed storage network (DSN) comprises:
memory;
an interface; and
a processing module operably coupled to the memory and the interface, wherein the processing module is operable to:
obtain a plurality of sets of write requests regarding a plurality of sets of encoded data slices, wherein data objects are dispersed storage error encoded to produce pluralities of sets of encoded data slices that are stored in one or more sets of storage units of the DSN, wherein the pluralities of sets of encoded data slices include the plurality of sets of encoded data slices; and
during a first time period:
identify a set of storage units of the one or more sets of storage units;
identify a first namespace subrange of a namespace associated with the set of storage units;
issue a first set of write requests of the plurality of sets of write requests to a first subset of storage units of the set of storage units, wherein the first set of write requests includes one or more first sets of encoded data slices of the plurality of sets of encoded data slices, and one or more first sets of slice names associated with the one or more first sets of encoded data slices, and wherein the one or more first sets of slice names map the one or more first sets of encoded data slices to storage addresses within the first namespace subrange; and issue a second set of write requests of the plurality of sets of write requests to a second subset of storage units of the set of storage units, wherein the second subset of storage units includes at least one different storage unit than the first subset of storage units, wherein the second set of write requests includes one or more second sets of encoded data slices of the plurality of sets of encoded data slices, and one or more second sets of slice names associated with the one or more second sets of encoded data slices, and wherein the one or more second sets of slice names map the one or more second sets of encoded data slices to storage addresses within the first namespace subrange.

11. The computing device of claim 10, wherein the processing module is further operable to:
during a second time period:
identify a second namespace subrange of the namespace associated with the set of storage units;
issue a third set of write requests of the plurality of sets of write requests to the first subset of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
issue a fourth set of write requests of the plurality of sets of write requests to the second subset of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

12. The computing device of claim 10, wherein the processing module is further operable to:
during a second time period:
identify a second namespace subrange of the namespace associated with the set of storage units;
issue a third set of write requests of the plurality of sets of write requests to the first subset of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
issue a fourth set of write requests of the plurality of sets of write requests to the first subset of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

13. The computing device of claim 10, wherein the processing module is further operable to:
during a second time period:
identify a second set of storage units of the one or more sets of storage units;
identify a second namespace subrange of a second namespace associated with the second set of storage units;
issue a third set of write requests of the plurality of sets of write requests to a third subset of storage units of the second set of storage units, wherein the third set of write requests includes one or more third sets of encoded data slices of the plurality of sets of encoded data slices, and one or more third sets of slice names associated with the one or more third sets of encoded data slices, wherein the one or more third sets of slice names map the one or more third sets of encoded data slices to storage addresses within the second namespace subrange; and
issue a fourth set of write requests of the plurality of sets of write requests to a fourth subset of storage units of the second set of storage units, wherein the fourth set of write requests includes one or more fourth sets of encoded data slices of the plurality of sets of encoded data slices, and one or more fourth sets of slice names associated with the one or more fourth sets of encoded data slices, wherein the one or more fourth sets of slice names map the one or more fourth sets of encoded data slices to storage addresses within the second namespace subrange.

14. The computing device of claim 10, wherein the processing module is operable to identify the set of storage units by:
generating a vault identification and a generation number;
obtaining a rounded timestamp and a capacity factor, wherein the obtaining the rounded timestamp includes rounding a current timestamp up to an end of the first time period;
generating a temporary object number based on the rounded timestamp and the capacity factor;
generating a temporary source name based on the vault identification, the generation number, and the temporary object number; and
identifying the set of storage units of the one or more sets of storage units of the DSN based on the temporary source name.

15. The computing device of claim 14, wherein the processing module is operable to generate the vault identification and the generation number by one or more of:
performing a registry lookup;
accessing a requesting entity to vault identification (ID) table; and
determining a current generation number indicator for the vault ID.

16. The computing device of claim 14, wherein the processing module is operable to determine the capacity factor by at least one of:
obtaining an expected processing performance level of the set of storage units; and obtaining an expected processing performance level of the computing device.

17. The computing device of claim 14, wherein the processing module is operable to obtain the capacity factor by at least one of:
   determining the capacity factor based on performance information for available sets of storage units of the one or more sets of storage units;
   performing a lookup;
   interpreting an error message; and
   identifying a capacity level of the computing device.

18. The computing device of claim 14, wherein the processing module is operable to identify the first namespace subrange of the namespace associated with the set of storage units by:
   generating an object number modifier based on the rounded timestamp and the capacity factor; and
   combining the temporary source name and the object number modifier to produce a source name, wherein the source name includes the vault identification, the generation number and an object number, wherein the temporary object number is modified based on the object number modifier to produce an object number; and
   identifying the first namespace subrange based on the source name.

* * * * *